O. EWERT.
VAPOR BURNER.
No. 11,607. Reissued June 15, 1897.
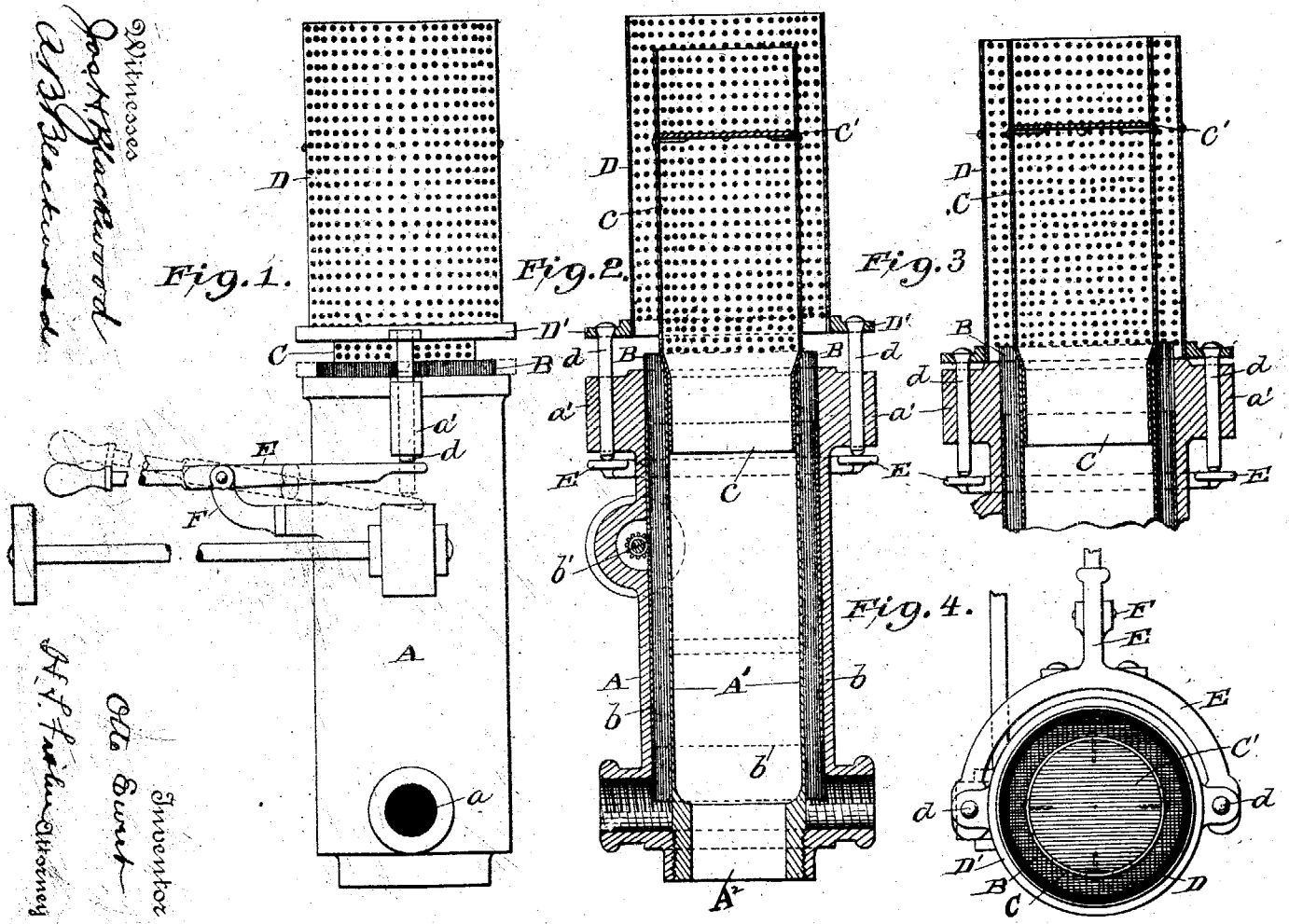
Witnesses
Jos. H. Blackwood
A. B. Blackwood
Inventor
Otto Ewert
H. S. Fraim Attorney

UNITED STATES PATENT OFFICE.

OTTO EWERT, OF CLEVELAND, OHIO, ASSIGNOR, BY MESNE ASSIGNMENTS, OF ONE-HALF TO JOHN A. LANNERT AND WILLIAM R. JEAVONS, OF SAME PLACE.

VAPOR-BURNER.

SPECIFICATION forming part of Reissued Letters Patent No. 11,607, dated June 15, 1897.

Original No. 361,934, dated April 26, 1887. Application for reissue filed May 13, 1897. Serial No. 637,021.

*To all whom it may concern:*

Be it known that I, OTTO EWERT, a citizen of the United States, residing at Cleveland, in the county of Cuyahoga and State of Ohio, have invented a certain new and Improved Vapor-Burner, of which the following is a full and complete description.

This invention relates to improvements in vapor-burners of the Argand variety having perforated tubes arranged about the wick to form a mixing and combining chamber. In this chamber the vapor generated from the wick is combined with a portion of air, which produces carbon-monoxid gas, and this gas issues from and is consumed at the top of the combining-chamber, as hereinafter fully described.

The invention consists in extending a diaphragm across the bore of the inner perforated tube, so that the current of air passing up within the inner tube is arrested and forced through the perforations of the said inner tube into the combining-chamber below said diaphragm, thereby promoting the formation of carbon monoxid in the combining-chamber and producing a space above the diaphragm and protected thereby in which the monoxid gas is sheltered and mixed before being wholly consumed. This protected mixing-place is within the zone of the gases issuing from the combining-chamber, as well as within the outer wall of flame above said chamber and inclosed thereby, and combustion plays over this mixing-space as it is fed by the evolved gases from within and air from without, maintaining an even blue flame over the top of the burner.

Prior to my invention two methods or ways of arresting or checking the air-currents within the inner tube were known—namely, a plug set into the top of the inner tube and projecting some distance above the burner and a foraminous cap or plate across the immediate top of the inner tube—and both ways are shown in United States patent to Morrill, No. 44,548, of 1864. In this type of burner having a chamber formed by perforated walls the air entering the chamber is limited by the perforations at all points, so that after all comparatively little vapor is consumed in the chamber and a large proportion or percentage of the vapor evolved from the wick is converted into carbon-monoxid gas, which issues from and burns above the combining-chamber. It is exceedingly difficult to construct these burners so that the combining-chamber will be of exactly even width at all points, and hence the gases rising from different points in the said chamber vary in character and in some cases may contain a greater or less measure of unconverted vapor. Now assuming that we have a plug in the inner tube, as used by Morrill, the issuing flame will show the inequalities in the width of the chamber by its varying height and character at different points. On the other hand, by using a foraminous cap, as in Morrill, the very free and comparatively large volume of air passing up through the inner tube produces simply an annular ring of flame at the top of the combining-chamber, which while showing by its unevenness the variations in the width of the combining-chamber also shows a yellowish color in its tongues of flame and an undesirable character altogether, due, apparently, to the rapid combustion of unconverted vapor present in the carbon-monoxid gases.

My invention avoids the several defects above mentioned and operates to produce uniformity in the combustion of the gases, all as fully hereinafter described.

In the accompanying drawings, Figure 1 is a side elevation of a vapor-burner embodying my invention and showing the outer tube raised, and Fig. 2 a central sectional elevation thereof. Fig. 3 is a central sectional elevation taken at right angles to the view shown in Fig. 1 with the outer tube down. Fig. 4 is a plan view of the burner.

A and A′ are concentric walls united or integral at the bottom to form a wick-container, and an opening $A^2$ is provided at the bottom to admit air inside the burner on the Argand principle. The tubular projections *a* on the outer wall are for attaching feed-pipes and supporting the burner. The wick B is usu ally inclosed in a gauze or perforated metal casing *b*, the latter being engaged by the spur-wheel *b'*, by means of which the wick is elevated or depressed uniformly.

The outer perforated tube D of the combining-chamber is secured at its lower end to a band or holder D', the latter being secured to or carrying pins *d*, that pass through holes made in ears *a'* of the container A. A forked lever E is pivoted to or on an arm F, the latter being secured to the container. The prongs of the lever E abut the lower ends of the pins *d*, by means of which by pressing down on the outer end of the said lever the tube D is raised for the purpose of lighting or extinguishing the burner. Normally the tube D is down about the top of the wick, and no air is admitted to the combining-chamber at its bottom when said tube D is seated.

C is the inner perforated tube of the combining-chamber, which is shown as contracted at its bottom and sleeved within the inner wall of the wick-chamber to support itself.

Inside the perforated tube C, and located usually near the top thereof, is a diaphragm C', extending laterally across the bore of the tube. This diaphragm arrests the current of air that passes up inside the burner, as already described, and deflects air into the combining-chamber beneath said diaphragm in proportion as the perforations of the tube will admit. The said diaphragm also affords a mixing-space over and above it accessible to the vapors and gases issuing from the combining-chamber and rolling naturally into this space, where such vapors and gases can combine and commingle and are ultimately consumed by the overlying flame.

For the better understanding of the invention reference is had to the operation of the burner. In operation vapor is evolved from the wick, and air entering through the perforations in the walls of the chamber partial combustion occurs and all or substantially all the vapor is converted into carbon-monoxid gas. The more complete this conversion the better the results. The monoxid gas, together with the small measure of unconverted vapor that may be present therein, passes up and issues from the top of the combining-chamber and extends, in process of combustion, to some distance above and forms an overspreading flame from side to side. The top of the inner tube being surrounded by the zone of gases and flame issuing from the combining-chamber and the air from below being arrested by the diaphragm C a partial vacuum is formed in the protected space above the diaphragm, which induces an inward flow of the gases to fill this space. Combustion then occurs only at the outer surface of the gas where it is in contact with the air, while within this envelop of flame the gases and vapors are found to be combining, commingling, and mixing as already described.

It has been seen that the diaphragm C' is located some distance below the top of the outer tube, and in this instance below the top of the inner tube as well, and that the inner tube is provided with openings or perforations above said diaphragm. The advantage of these openings is obvious, particularly when a low flame is maintained, say on a plane with the top of the tubes or thereabout. In that case, and particularly when the flame is so low that the monoxid gases cannot overflow into the combining-space above the diaphragm, they issue through the openings in the tube C and fill said space, and it follows that combustion occurs from their surface on a plane substantially even with the flame in the combining-chamber, and so a flame spreads across the top of the burner, more or less perfectly, as before. This could not occur if the tube C were imperforate or had no openings above diaphragm C'. The advantage of this operation is therefore apparent and material because it keeps up a closed flame instead of a mere ring of flame at low planes A diaphragm constructed and operating substantially as herein shown and described has the advantage of providing a mixing and combining space into which the unconsumed gases and vapor will naturally overflow from all around the top of the burner, and in this particular differs from any device which might occupy space at the top of the inner tube, and by reason of its construction, position, or arrangement practically deprive the burner of such mixing-space.

What I claim as new, and desire to secure by Letters Patent, is—

1. In a vapor-burner of the Argand variety, the combination with perforated tubes located, respectively, inside and outside the wick, as shown, of a diaphragm made to extend laterally across the inner perforated tube and practically close the same against the upward passage of air, substantially as described.

2. In a vapor-burner of the Argand variety, two perforated tubes arranged to form a combining-chamber between them, and an imperforate diaphragm extending laterally across the bore of the inner tube, substantially as described.

3. In a hydrocarbon-burner, two perforated tubes and a diaphragm spanning the bore of the inner tube below the upper end thereof, whereby a portion of said tube is made to project above said diaphragm and a mixing-space is produced in the upper end of said tube, substantially as described.

4. In a vapor-burner the inner and outer perforated tubes forming a combining-chamber between them and an imperforate diaphragm spanning the bore of the inner tube and constructed and arranged to provide a combining and mixing space below the top of the outer tube, substantially as described.

5. A vapor-burner having a pair of perforated tubes forming a combining-chamber, a diaphragm across the inner tube, said inner tube being provided with openings above said diaphragm through which vapor and gas from the combining-chamber flow into the space over said diaphragm, substantially as described.

OTTO EWERT.

Witnesses:
E. T. BUTLER,
A. E. GILBERT.